(12) United States Patent
Middel

(10) Patent No.: US 11,597,464 B2
(45) Date of Patent: Mar. 7, 2023

(54) ROD PIECE CONNECTION DEVICE, AND BICYCLE FRAME AND TANDEM BICYCLE FRAME HAVING THE SAME

(71) Applicant: IDEAL BIKE CORPORATION, Taichung (TW)

(72) Inventor: Lennart Pieter Middel, Rotterdam (NL)

(*) Notice: Subject to any disclaimer, the term of this patent is extended or adjusted under 35 U.S.C. 154(b) by 283 days.

(21) Appl. No.: 16/991,030

(22) Filed: Aug. 12, 2020

(65) Prior Publication Data

US 2022/0048590 A1 Feb. 17, 2022

(30) Foreign Application Priority Data

Aug. 27, 2019 (TW) .................................. 108130616

(51) Int. Cl.
*B62K 19/28* (2006.01)
*B62K 3/14* (2006.01)
*B62K 19/06* (2006.01)

(52) U.S. Cl.
CPC ................ *B62K 19/28* (2013.01); *B62K 3/14* (2013.01); *B62K 19/06* (2013.01)

(58) Field of Classification Search
CPC .......... B62K 3/14; B62K 19/06; B62K 19/18; B62K 19/24; B62K 19/28
USPC .............................................. 280/281.1, 287
See application file for complete search history.

(56) References Cited

U.S. PATENT DOCUMENTS 4,842,292 A * 6/1989 Wang .................. B62K 15/008
280/30
2018/0099721 A1* 4/2018 Laxström ................. B62K 3/04

FOREIGN PATENT DOCUMENTS

CN 106143748 A * 11/2016

* cited by examiner

*Primary Examiner* — Kevin Hurley
*Assistant Examiner* — Felicia L. Brittman

(57) ABSTRACT

A rod piece connection device, comprising: a first connection piece and a second connection piece. The first connection piece includes a first rod piece connection end and a first joggle joint end opposite to the first rod piece connection end. Wherein, the first joggle joint end includes a protrusion head tongue portion and a neck portion. The second connection piece includes a second rod piece connection end and a second joggle joint end opposite to the second rod piece connection end. The second joggle joint end is located corresponding to the first joggle joint end for them to form into a joggle joint. The second joggle joint end includes a protrusion bottom groove portion and a pillow portion. Wherein the protrusion head tongue portion is disposed corresponding into the protrusion bottom groove portion, and the neck portion is located corresponding to the pillow portion.

16 Claims, 17 Drawing Sheets

ROD PIECE CONNECTION DEVICE, AND BICYCLE FRAME AND TANDEM BICYCLE FRAME HAVING THE SAME

BACKGROUND OF THE INVENTION

Field of the Invention

The preferred embodiment of the present invention relates to a rod piece connection device, and in particular to a rod piece connection device used in a bicycle frame or a tandem bicycle frame.

The Prior Arts

In recent years, due to the draining and depletion of the fossil fuel resources, the oil price has increased rapidly. And along with the rise of environmental awareness, now people in the city tend to use bicycle as a means of transportation for convenience and prevention of air pollution. On the other hand, along with the economic growth and population increase in the city, in a crowded city, traffic congestion has become a serious problem, and it is rather difficult to find a parking space for a vehicle. Therefore, for people now living and working in a city, bicycle is a useful and convenient means of transportation.

However, for a conventional bicycle, the frame of bicycle is built into one piece of integral body through welding and fixing, and it has a rather long and narrow contour. Due to its size and shape, it is rather difficult to place a bicycle in the house for parking or put into a vehicle for transportation, for it occupies too much space. For this reason, a folding bicycle frame is developed to overcome the deficiencies mentioned above.

For the folding bicycle frame of the existing technology, hinges and fasteners are placed between an upper tube and a lower tube, to form into a bending structure that is easy to detach and unfold. In order to raise the structure strength of the folding bicycle frame, presently, quite a lot of reinforced materials and reinforced components are required to use, to ensure its safety in operation. However, in this way, the overall weight of the folding bicycle frame is increased, to add burden to the user, and cause inconvenience to the user in transportation.

Therefore, presently, the design and performance of the bicycle frame is not quite satisfactory, and it leaves much room for improvement.

SUMMARY OF THE INVENTION

In view of the problems and drawbacks of the prior art, the preferred embodiment of the present invention provides a rod piece connection device and a bicycle frame or a tandem bicycle frame having the same, to solve the shortcomings of the prior art.

The objective of the present invention is to provide a rod piece connection device, adapted to be the rod pieces of a bicycle frame, and through the attaching and detaching of the corresponding first connection piece and the second connection piece that are detachable, the rod pieces of the bicycle frame can be assembled or detached depending on the actual requirement, to reduce the volume of the bicycle frame and thus the space it occupies. In addition, the rod piece connection device provided by the present invention is able to achieve joggle joint, thus reducing the additional weight caused by the hinges and fasteners of the conventional folding bicycle frame, providing convenience of shipping and moving the bicycle, while reducing the burden of the user during its carriage.

In order to achieve the objective mentioned above, the present invention provides a rod piece connection device, that includes a first connection piece, and a second connection piece. The first connection piece includes a first rod piece connection end and a first joggle joint end opposite to the first rod piece connection end. Wherein, the first joggle joint end includes a protrusion head tongue portion and a neck portion. The second connection piece includes a second rod piece connection end and a second joggle joint end opposite to the second rod piece connection end, the second joggle joint end is located corresponding to the first joggle joint end for them to form into a joggle joint. The second joggle joint end includes a protrusion bottom groove portion and a pillow portion. Wherein the protrusion head tongue portion is disposed corresponding to and into the protrusion bottom groove portion, and the neck portion is located corresponding to the pillow portion.

The present invention further provides a bicycle frame, that includes a head tube a seat tube, a plurality of rod piece connection devices, an upper tube, and a lower tube. The head tube is connected to a direction handle and a front fork; and the seat tube is connected to a saddle (also referred to as seat pad), a pedal driving component, a rear upper fork, a rear lower fork. The upper tube has its two ends connected to the head tube and a seat tube respectively. Wherein at least one of the head tube and the seat tube is connected to the upper tube through using at least one of the rod piece connection devices. The lower tube has its two ends connected to the head tube and the seat tube respectively. Wherein at least one of the head tube and the seat tube is connected to the lower tube through using at least one of the rod piece connection devices.

The present invention further provides a tandem bicycle frame, that includes a head tube, a first seat tube, a second seat tube, a plurality of rod piece connection devices, an upper connection tube, and a lower connection tube. The head tube is connected to a direction handle and a front fork; the first seat tube is connected to a first saddle, and a first pedal driving component. Wherein the head tube and the first seat tube are connected through using at least a front upper tube and a front lower tube in between. The second seat tube is connected to a second saddle, and a second pedal driving component, a rear upper fork, and a rear lower fork. The upper connection tube has its two ends connected to the first seat tube and the second seat tube respectively. Wherein, at least one of the first seat tube and the second seat tube is connected to the upper connection tube through using at least one of the rod piece connection devices. The lower connection tube has its two ends connected to the first seat tube and the second seat tube respectively. Wherein at least one of the first seat tube and the second seat tube is connected to the lower connection tube through using at least one of the rod piece connection devices.

The advantage of the present invention is that, the rod piece connection device can be used as a rod piece in a bicycle frame, and through attaching and detaching of the corresponding first connection piece and the second connection piece that are detachable, the rod pieces of the bicycle frame can be assembled or detached depending on the actual requirement, to reduce the volume of the bicycle frame and thus the space it occupies. In addition, the rod piece connection device provided by the present invention is able to achieve joggle joint, thus reducing the additional weight caused by the hinges and fasteners of the conventional folding bicycle frame, providing convenience of shipping and moving the bicycle, while reducing the burden of the user during its carriage. Further, in the present invention, since the hinges and fasteners of the conventional folding bicycle are omitted, therefore, the rod piece connection device and the bicycle frame thus produced could have a compact, neat, and clean outer appearance in achieving better aesthetical effect.

Further scope of the applicability of the present invention and embodiments thereof will become apparent from the detailed descriptions given hereinafter. However, it should be understood that the detailed descriptions and specific examples, while indicating preferred embodiments of the present invention, are given by way of illustration only, since various changes and modifications within the spirit and scope of the present invention will become apparent to those skilled in the art from this detailed descriptions.

BRIEF DESCRIPTION OF THE DRAWINGS

Embodiments of the present invention are described below, by way of example only, with reference to the accompanying drawings in which.

DETAILED DESCRIPTION OF THE PREFERRED EMBODIMENT

Figure 1:
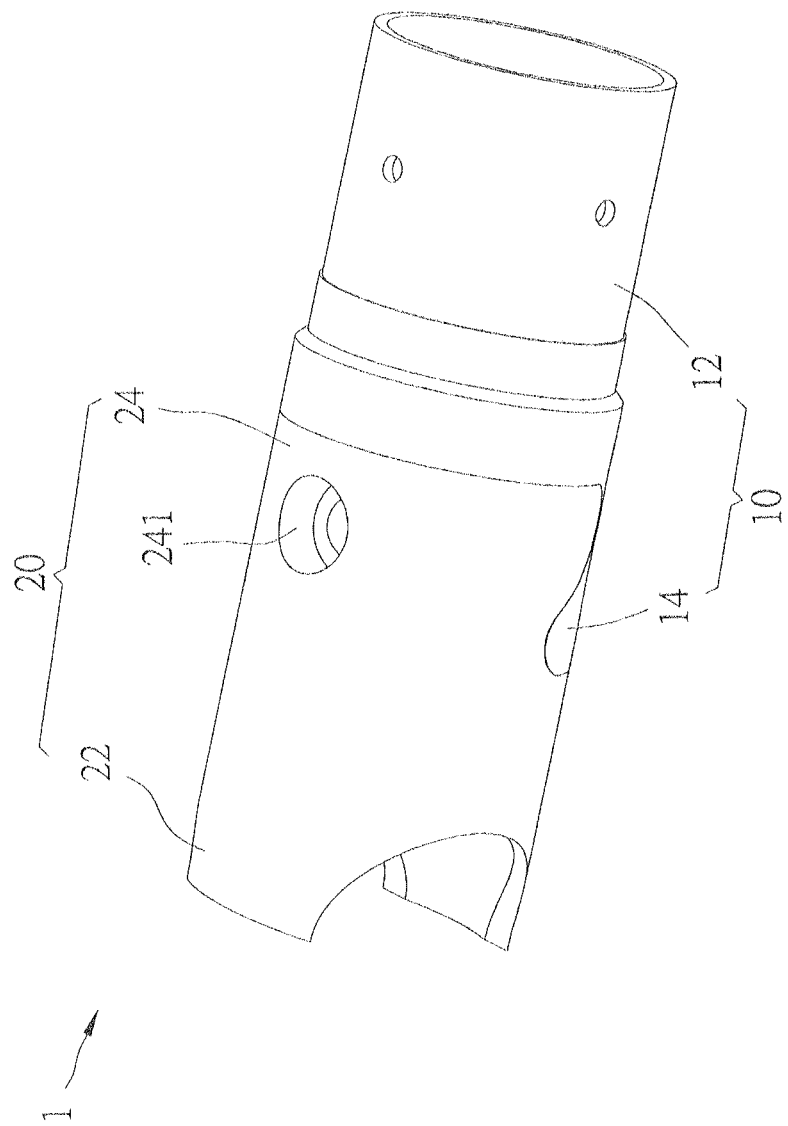
FIG. 1 is a perspective view of a rod piece connection device according to the present invention.
Figure 2:
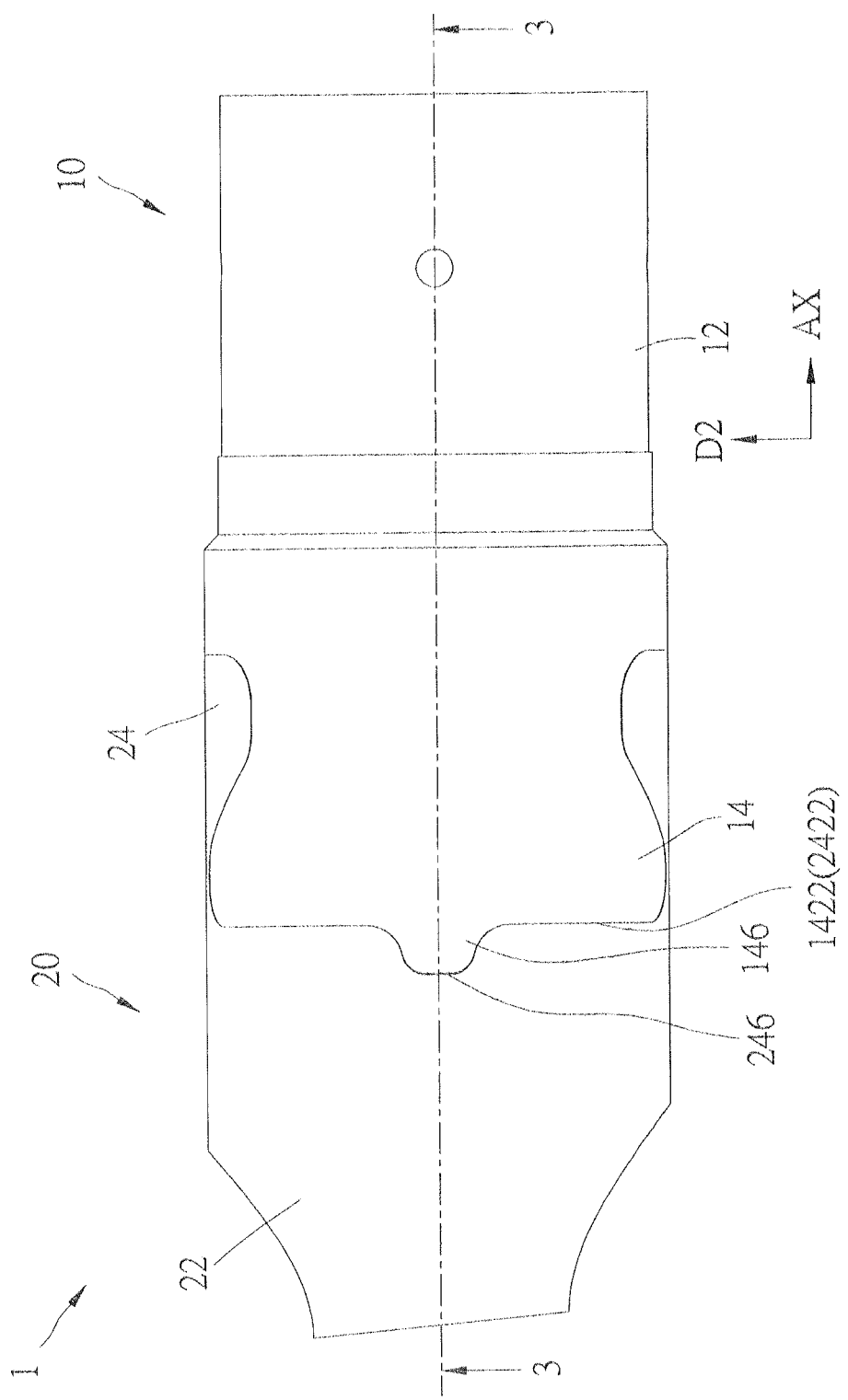
FIG. 2 is a side view of a rod piece connection device as shown in FIG. 1 according to the present invention.
Figure 3:
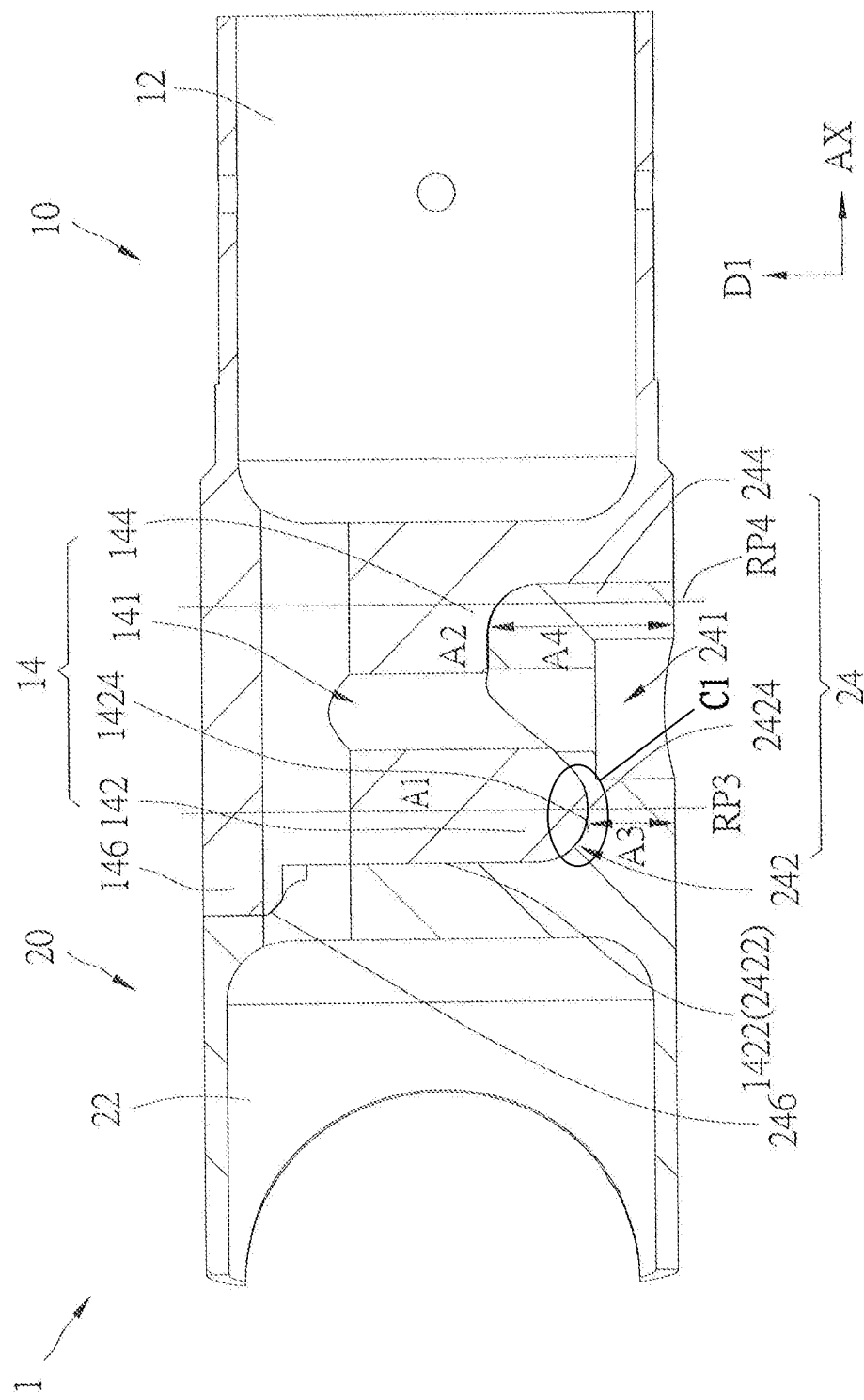
FIG. 3 is a cross section view of a rod piece connection device along a 3-3 direction as shown in FIG. 2 according to the present invention.
Figure 4:
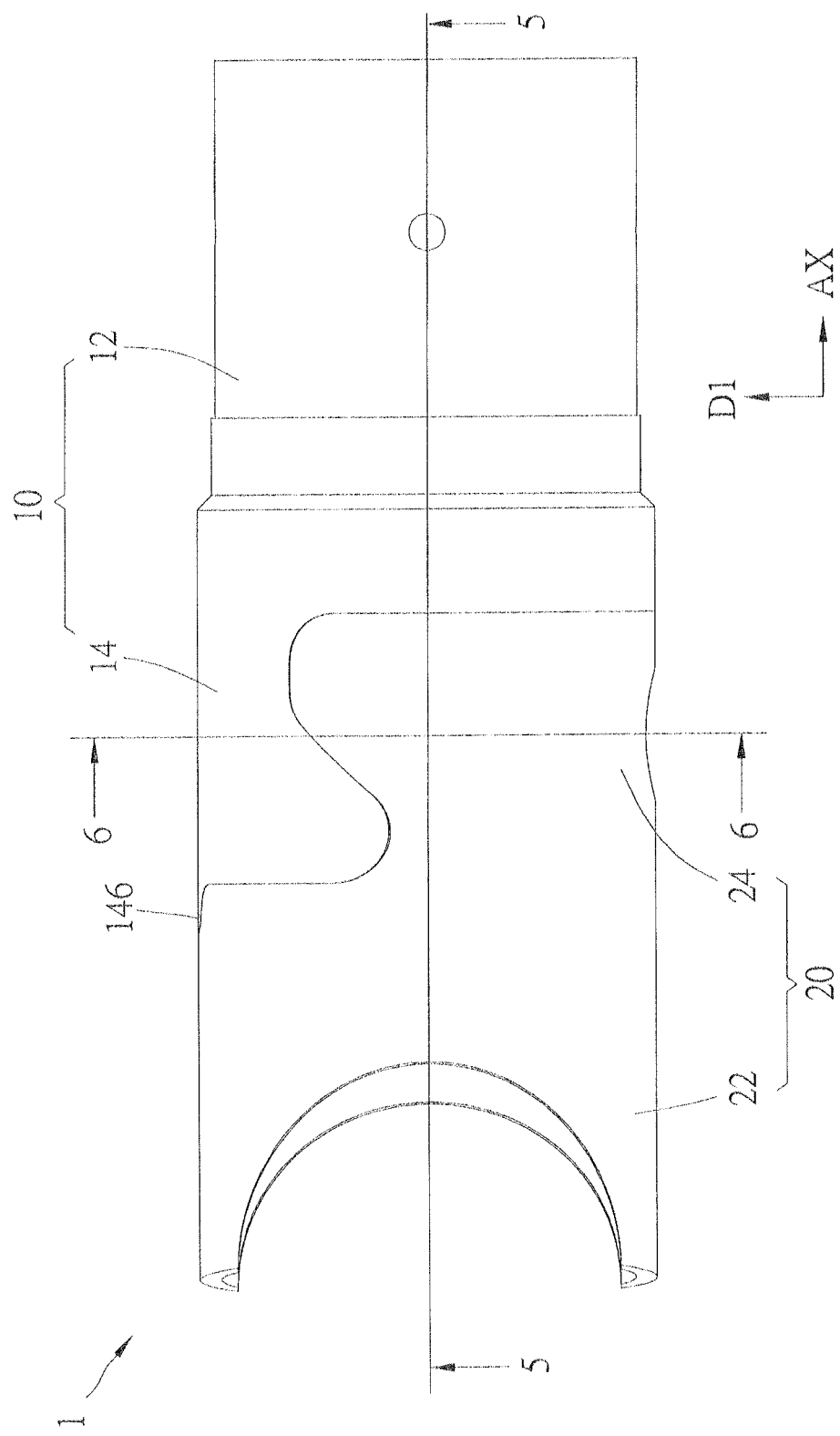
FIG. 4 is another side view of a rod piece connection device as shown in FIG. 1 according to the present invention.
Figure 5:
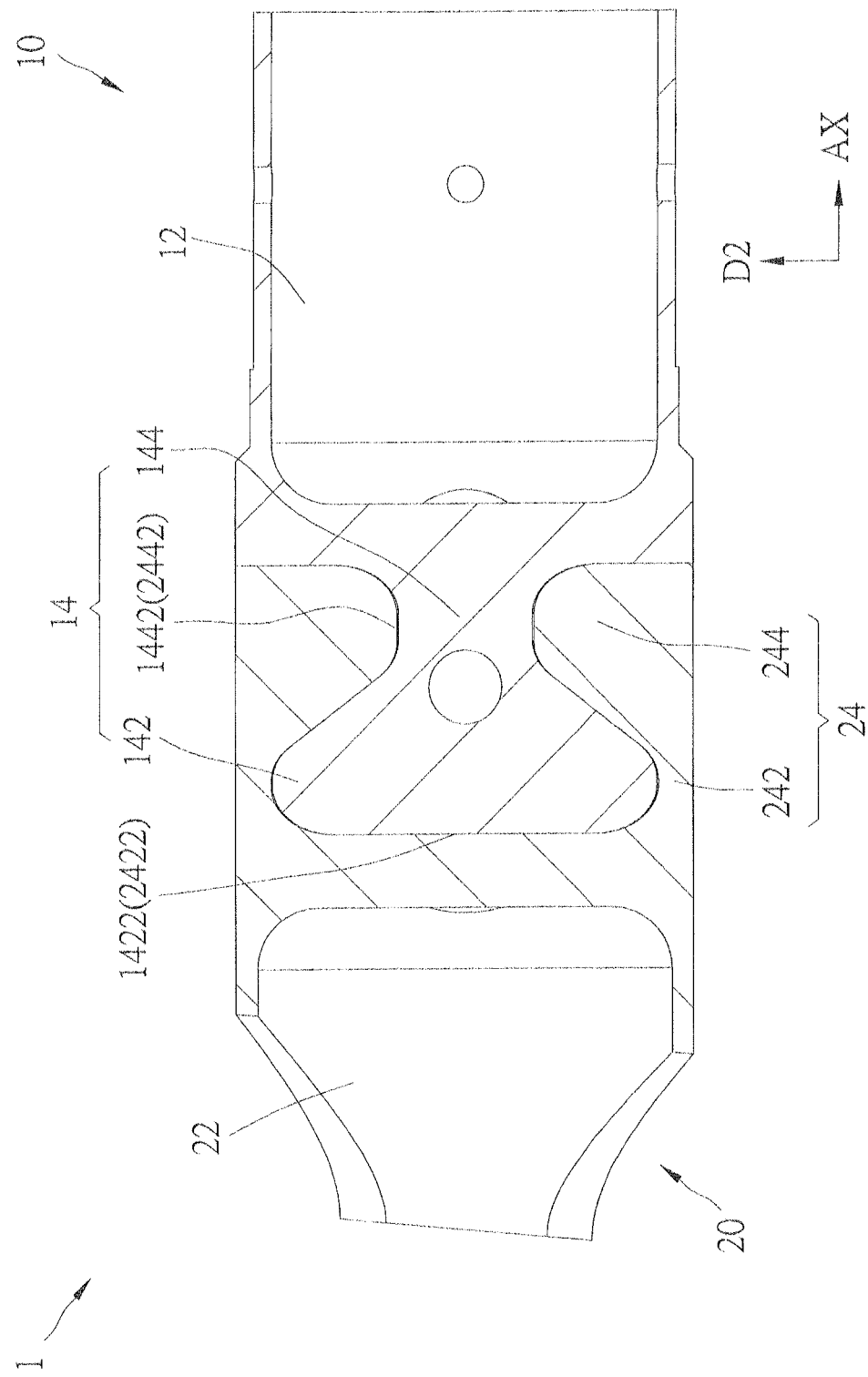
FIG. 5 is a cross section view of a rod piece connection device along a 5-5 direction as shown in FIG. 4 according to the present invention.
Figure 6:
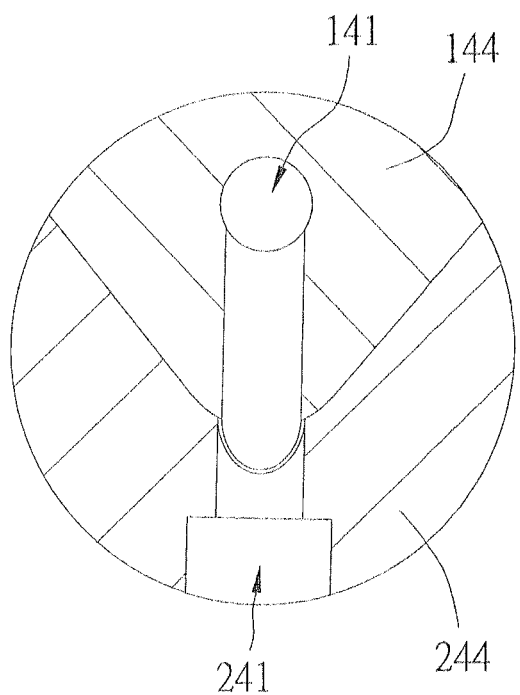
FIG. 6 is a cross section view of a rod piece connection device along a 6-6 direction as shown in FIG. 4 according to the present invention.
Figure 6:
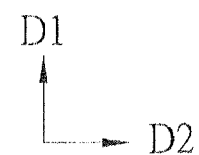
Figure 7A:
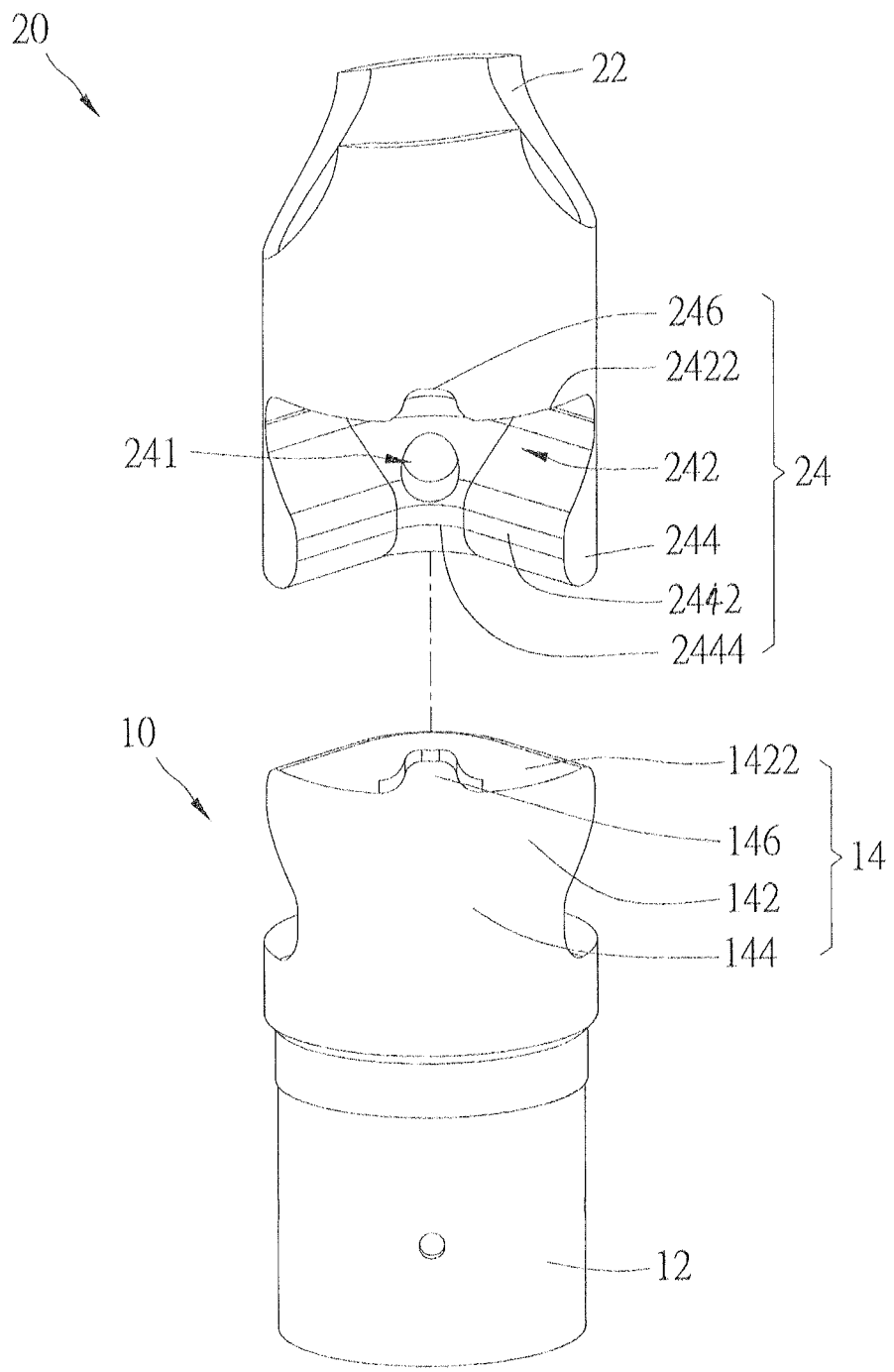
FIG. 7A is an exploded view of a rod piece connection device as shown in FIG. 1 according to the present invention.
Figure 7B:
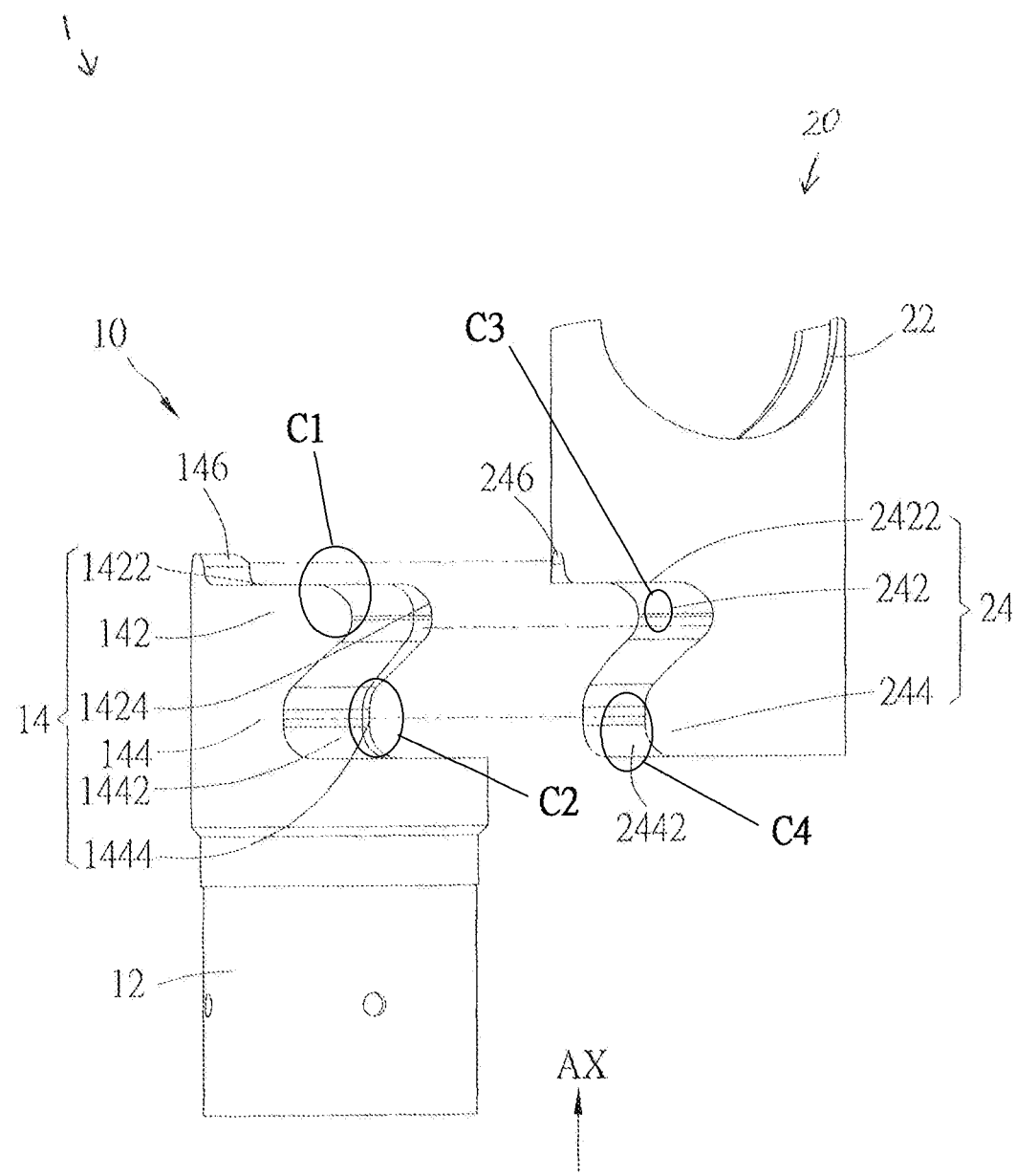
FIG. 7B is another exploded view of a rod piece connection device as shown in FIG. 1 according to the present invention.
Figure 8:
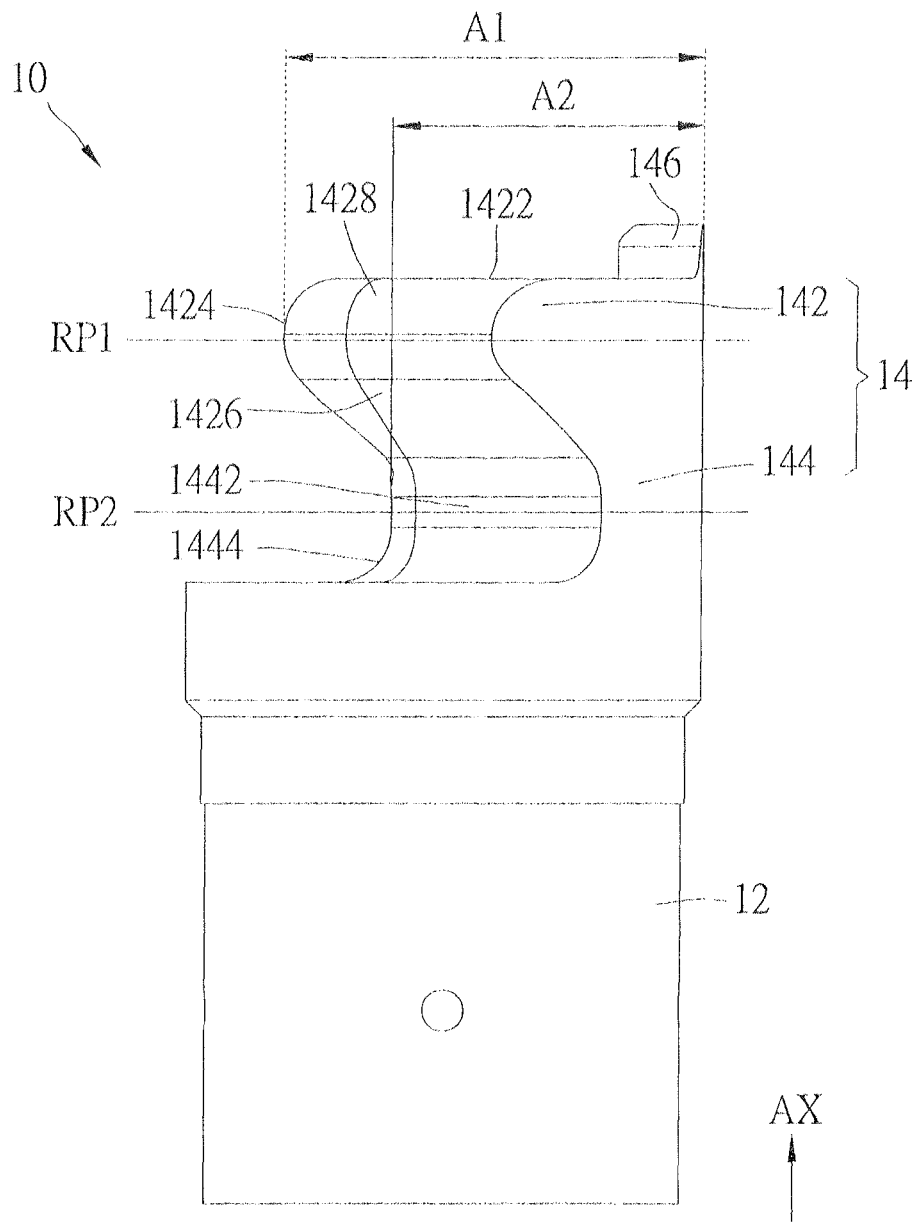
FIG. 8 is a side view of a first connection piece of the rod piece connection device as shown in FIG. 1 according to the present invention.
Figure 9:
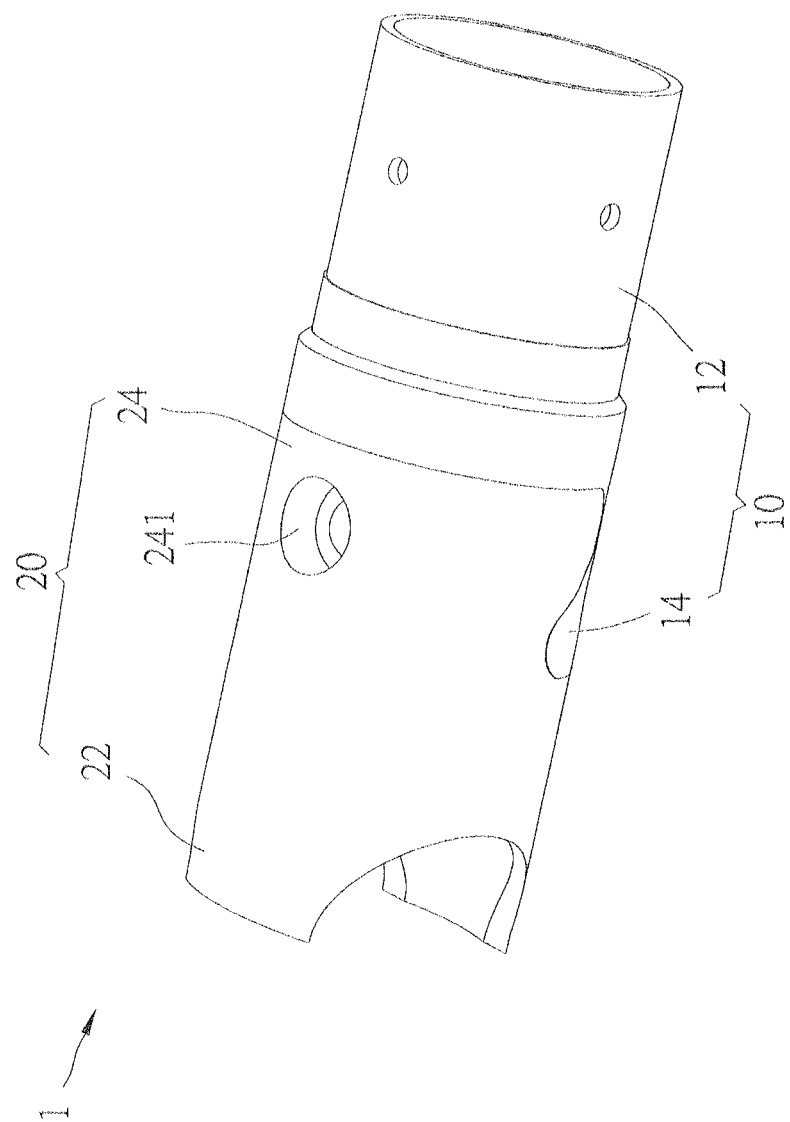
FIG. 9 is an end view of a first connection piece as shown in FIG. 8 according to the present invention.
Figure 10:
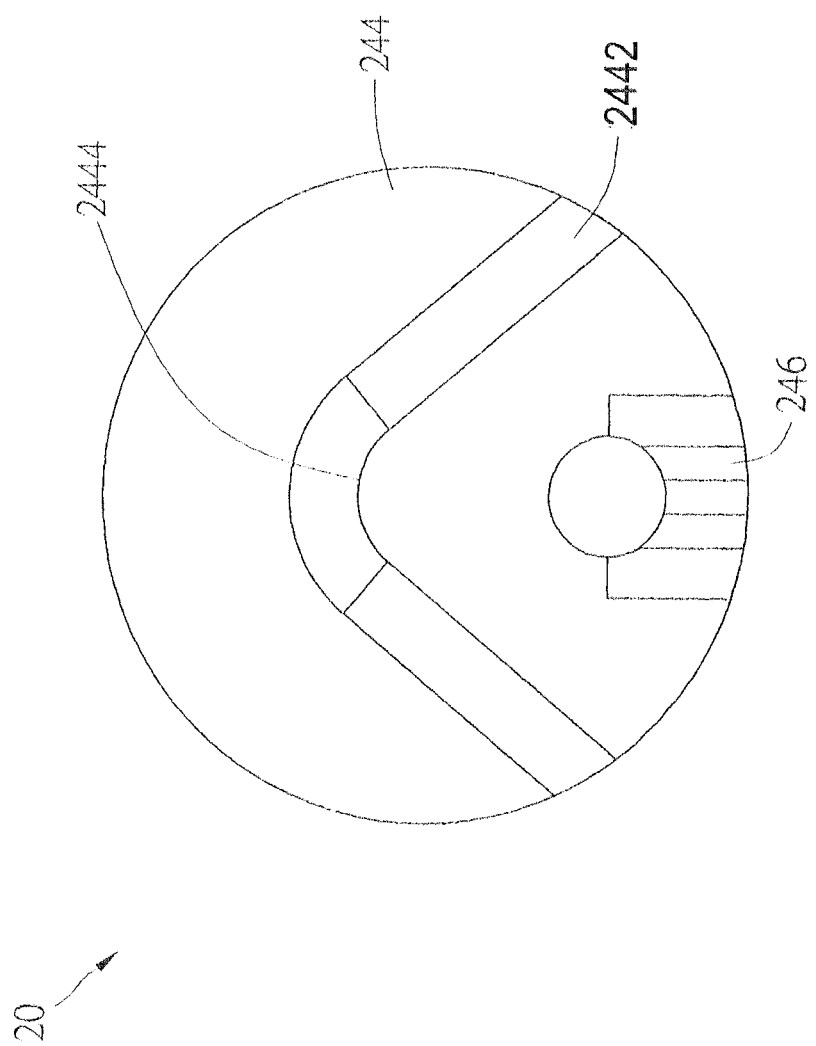
FIG. 10 is an end view of a second connection piece of the rod piece connection device as shown in FIG. 7 according to the present invention.
Figure 11:
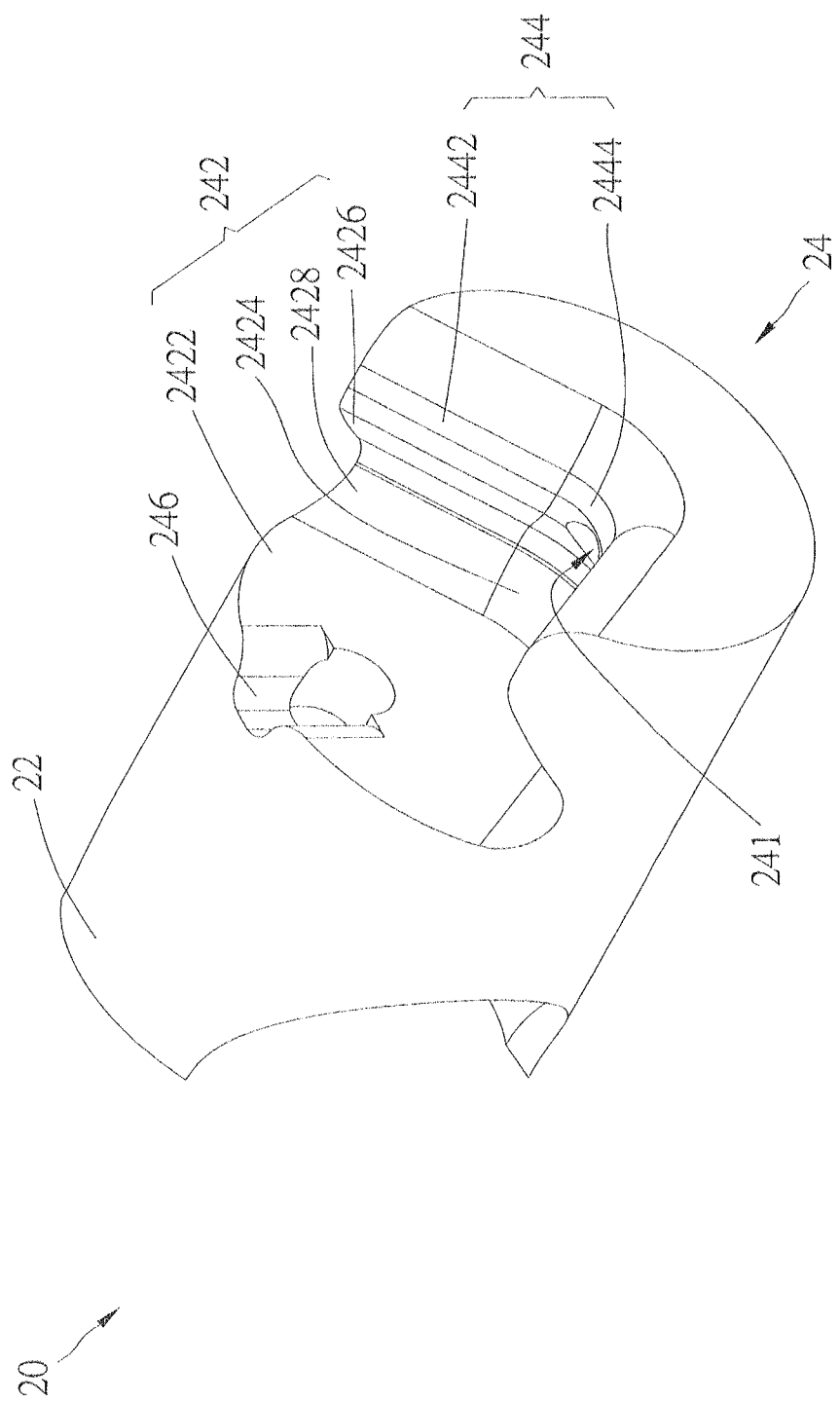
FIG. 11 is a perspective view of a second connection piece as shown in FIG. 7 according to the present invention.
Figure 12:
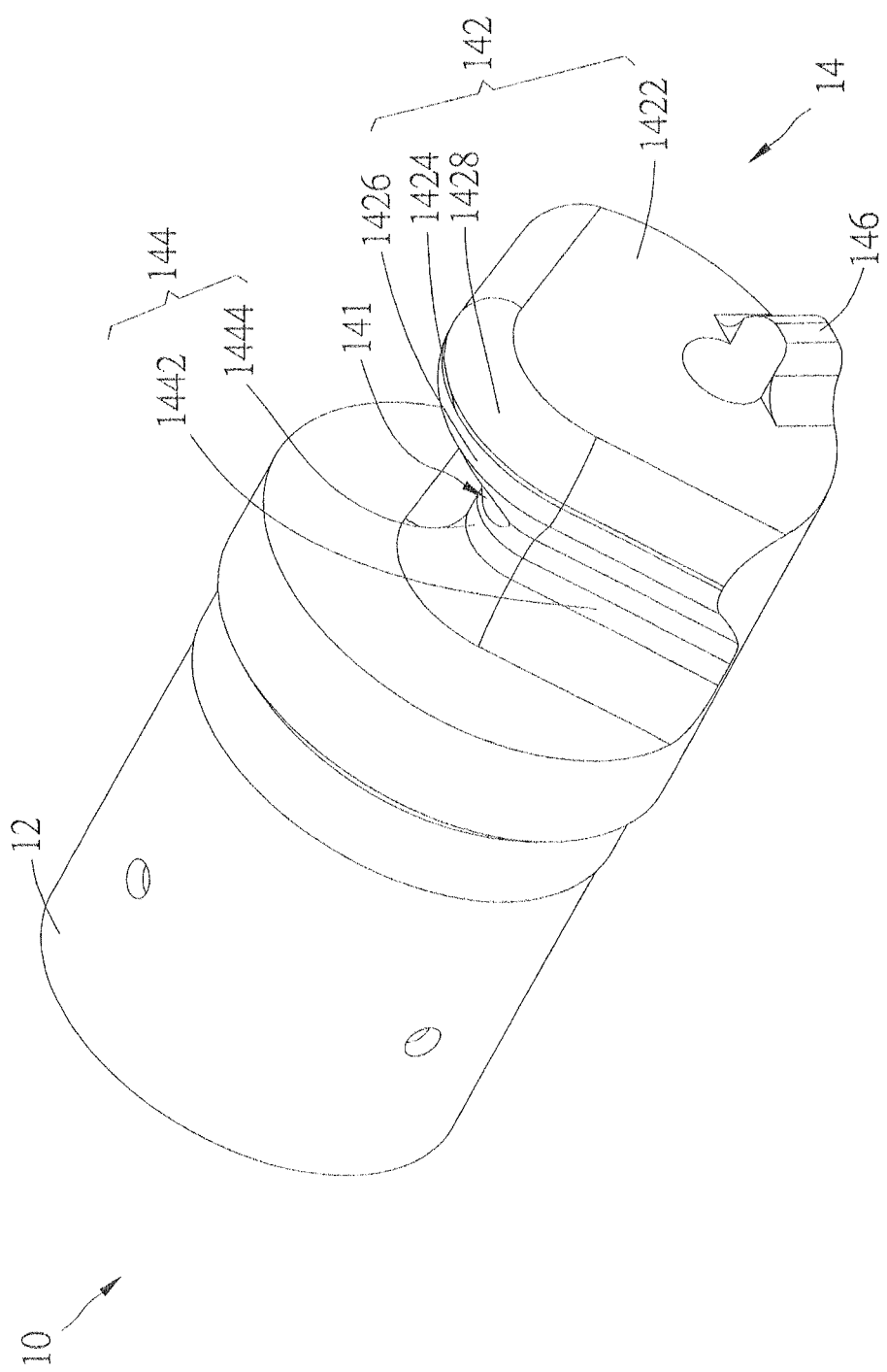
FIG. 12 is a perspective view of a first connection piece as shown in FIG. 7 according to the present invention.

The purpose, construction, features, functions and advantages of the present invention and its embodiments can be appreciated and understood more thoroughly through the following detailed descriptions with reference to the attached drawings.

Refer to FIGS. 1 to 12 respectively for detail descriptions of the rod piece connection device according to the present invention.

The embodiment of the present invention provides a rod piece connection device 1, that includes a first connection piece 10 and a second connection piece 20. The first connection piece 10 includes a first rod piece connection end 12 and a first joggle joint end 14, the first joggle joint end 14 is located opposite to the first rod piece connection end 12. In an embodiment of the present invention, the first joggle joint end 14 includes a protrusion head tongue portion 142 and a neck portion 144.

The second connection piece 20 includes a second rod piece connection end 22 and a second joggle joint end 24. The first connection piece 10 and the second connection piece 20 are connected coaxially together through radial connection. The second joggle joint end 24 is located opposite to the second rod piece connection end 22. In an embodiment of the invention, the second joggle joint end 24 is located corresponding to the first joggle joint end 14 to form together into a joggle joint. The second joggle joint end 24 includes a protrusion bottom groove portion 242 and a pillow portion 244. Wherein the protrusion head tongue portion 142 is disposed corresponding to and into the protrusion bottom groove portion 242, and the neck portion 144 is located corresponding to the pillow portion 244. In the present embodiment, the first joggle joint end 14 and the second joggle joint end 24 are formed into a tight joggle joint together, but first joggle joint end 14 is not symmetric to the second joggle joint end 24. To be more specific, the structure and shape of the first joggle joint end 14 are quite different from those of the second joggle joint end 24.

In an embodiment of the present invention, the first joggle joint end 14 includes a position restricting protrusion block 146, and is disposed on the end face 1422 of the protrusion head tongue portion 142 in protrusion along the axial direction AX of the first connection piece 10. The second joggle joint end 24 includes a position restricting indent groove 246 and is disposed indent into the side face 2422 of the protrusion bottom groove portion 242, along the axial direction AX of the second connection piece 20. In an embodiment of the present invention, when the second joggle joint end 24 and the first joggle joint end 14 are connected to each other to form into a joggle joint, the position restricting protrusion block 146 and the position restricting indent groove 246 are connected to each other in matching, and the end face 1422 of the protrusion head tongue portion 142 is in contact with the side face 2422 of the protrusion bottom groove portion 242. In an embodiment of the present invention, through matching and connection of the position restricting protrusion block 146 to the position restricting indent groove 246, the first joggle joint end 14 and the second joggle joint end 24 are not able to make relative rotations to each other, to prevent the relative rotation dislocations between the first connection piece 10 and the second connection piece 20, in achieving enhanced connection and stability between the first joggle joint end 14 and the second joggle joint end 24.

In an axial direction AX of the first connection piece 10, the protrusion head tongue portion 142 is disposed between the position restricting protrusion block 146 and the neck portion 144. In an embodiment of the present invention, and in an axial direction AX of the second connection piece 20, the protrusion bottom groove portion 242 is located between the position restricting indent groove 246 and the pillow portion 244.

In the axial direction AX of the first connection piece 10, the neck portion 144 is located close to the first rod piece connection end 12, and the protrusion head tongue portion 142 is located away from the first rod piece connection end 12. In an embodiment of the present invention, in the axial direction AX of the second connection piece 20, the pillow portion 244 is disposed away from the second rod piece connection end 22, and the protrusion bottom groove portion 242 is located close to the second rod piece connection end 22.

In an embodiment of the present invention, when the second joggle joint end 24 and the first joggle joint end 14 are connected to each other in a radial direction to form into a joggle joint, the protrusion head tongue portion 142 and the protrusion bottom groove portion 242 are connected to each other in matching, and the neck portion 144 and the pillow portion 244 are connected to each other in matching.

In an embodiment of the present invention, the protrusion head tongue portion 142 is provided with a first region A1 on a first radial plane RP1 of the first joggle joint end 14; and the neck portion 144 is provided with a second region A2 on second radial plane RP2 of first joggle joint end 14. In an embodiment of the present invention, the first radial plane RP1 is parallel to the second radial plane RP2, and the first region A1 of the protrusion head tongue portion 142 is configured to cover the second region A2 of the neck portion 144.

In the first region A1 is provided with a first arc C1 on a protrusion tongue position 1424 of the protrusion head tongue portion 142; and in the second region A2 is provided with a second arc C2 on a protrusion end position 1444 of the neck portion 144. In an embodiment of the present invention, the first arc C1 is greater than or equal to the second arc. However, in practice, the first arc C1 can be less than the second arc C2.

In an embodiment of the present invention, the protrusion bottom groove portion 242 is provided with a third region A3 on a third radial plane RP3 of the second joggle joint end 24; and the pillow portion 244 is provided with a fourth region A4 on a fourth radial plane RP4 of second joggle joint end 24. In an embodiment of the present invention, the third radial plane RP3 is parallel to the fourth radial plane RP4, the fourth region A4 of the pillow portion 244 is configured to cover the third region A3 of the protrusion bottom groove portion 242.

In the third region A3 is provided with a third arc C3 on a protrusion bottom position 2424 of the protrusion bottom groove portion 242; and in the fourth region A4 is provided with a fourth arc C4 on a indent bottom position 2444 of the pillow portion 244. In an embodiment of the present invention, the third arc C3 is equal to or greater than the fourth arc C4. However, in practice, the third arc C3 can be less than the second arc C4.

In an embodiment of the present invention, the first arc C1 is equal to the third arc C3, and the second arc C2 is equal to the fourth arc C4, so that the first joggle joint end 14 and the second joggle joint end 24 could be connected to form into a tight joggle joint.

In an embodiment of the present invention, the protrusion head tongue portion 142 is provided with a first slant leaning face 1426 and a second slant leaning face 1428, and are connected to each other in an axial direction AX of the first joggle joint end 14. The protrusion bottom groove portion 242 is provided with a third slant leaning face 2426 and a fourth slant leaning face 2428, connected to each other in an axial direction AX of the second joggle joint end 24. In an embodiment of the present invention, when the first joggle joint end 14 and the second joggle joint end 24 are connected to each other to form into a joggle joint, the first slant leaning face 1426 is in contact with the third slant leaning face 2426, the second slant leaning face 1428 is in contact with the fourth slant leaning face 2428, to act against a bending force in a first direction D1 and a retraction force in an axial direction AX. In an embodiment of the present invention, the bending force in the first direction D1 is perpendicular to an axial direction AX of the first joggle joint end 14 and the second joggle joint end 24, the retraction force in the axial direction AX is parallel to or connected coaxially to the axial direction AX of the first joggle joint end 14 and the second joggle joint end 24.

In an axial direction AX of the second joggle joint end 24, the pillow portion 244 is provided with a curved cladding face 2442. In the axial direction AX of the first joggle joint end 14, the neck portion 144 is provided with a curved cladded face 1442. In an embodiment of the present invention, when the first joggle joint end 14 and the second joggle joint end 24 are connected to each other to form into a joggle joint, the curved cladding face 2442 and the curved cladded face 1442 are in contact with each other, to act against the bending force in a second direction D2 and the retraction force in the axial direction AX. In an embodiment of the present invention, the bending force in the second direction D2 is perpendicular to the axial direction AX of the first joggle joint end 14 and the second joggle joint end 24, and the bending force in the second direction D2 is perpendicular to the bending force in the first direction D1.

In an embodiment of the present invention, the first joggle joint end 14 is provided with a first screw hole 141, and the second joggle joint end 24 is provided with a second screw hole 241. When the first joggle joint end 14 and the second joggle joint end 24 are connected to each other to form into a joggle joint, the first screw hole 141 of the first joggle joint end 14, and the second screw hole 241 of the second joggle joint end 24 are connected and in communication with each other coaxially. In an embodiment of the present invention, when the first joggle joint end 14 and the second joggle joint end 24 are connected to each other to form into a joggle joint, and the first screw hole 141 and the second screw hole 241 are connected and in communication with each other coaxially, a bolt (not shown) can be screwed into the first screw hole 141 and the second screw hole 241, so that the first connection piece 10 and the second connection piece 20 can be connected securely to each other.

In an embodiment of the present invention, through the protrusion head tongue portion 142 locating corresponding to and in the protrusion bottom groove portion 242, the neck portion 144 locating corresponding to the pillow portion 244, and the position restricting protrusion block 146 connecting the position restricting indent groove 246 in matching, such that the first joggle joint end 14 and the second joggle joint end 24 in the rod piece connection device 1 are able to absorb the deformation force (for example, bending force, rotation force, and dislocation force), to reduce the deformation force on the bolt, and to raise the deformation resistance strength and capability of the rod piece connection device 1.

Figure 13:
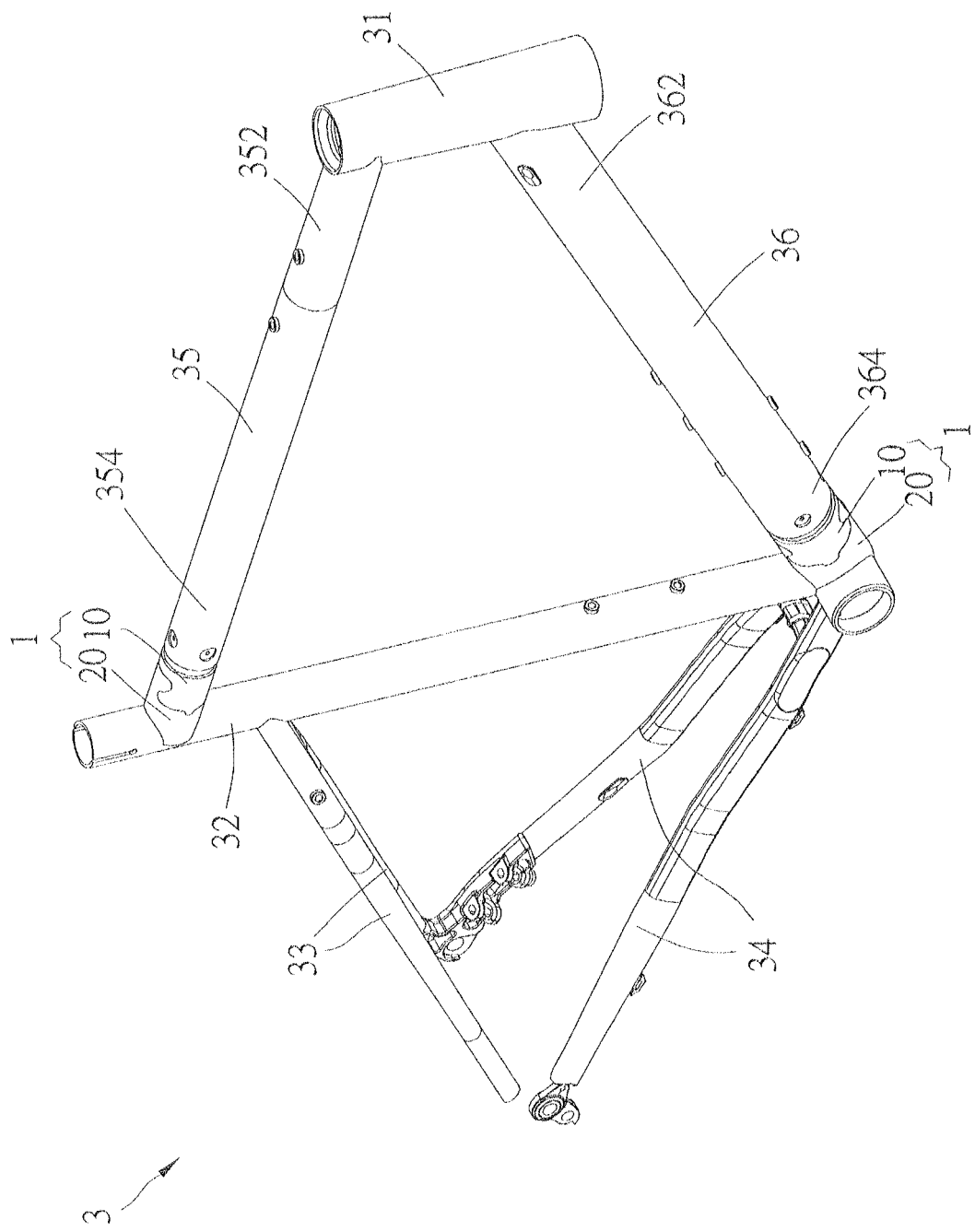
FIG. 13 is a perspective view of a bicycle frame according to an embodiment of the present invention.
Figure 14:
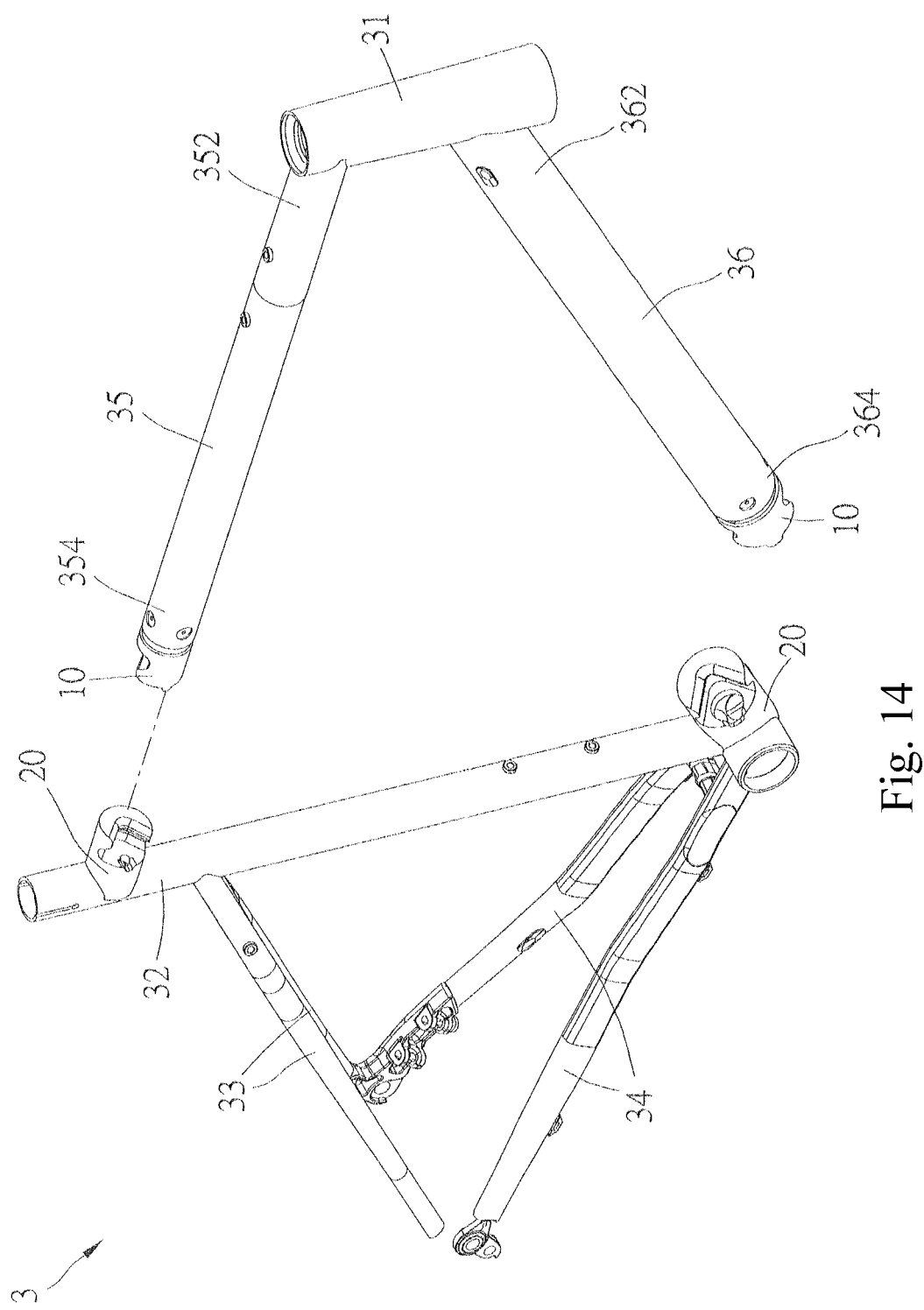
FIG. 14 is a partial exploded view of a bicycle frame as shown in FIG. 13 according to the present invention.

As shown in FIGS. 13 and 14, the bicycle frame 3 includes a head tube 31, a seat tube 32, a rear upper fork 33, a rear lower fork 34, an upper tube 35, a lower tube 36, and a plurality of rod piece connection devices 1 mentioned above.

Further, as shown in FIGS. 13 and 14, the head tube 31 is connected to a direction handle (not shown) and a front fork (not shown). The seat tube 32 is connected to a saddle (not shown), a pedal driving component (not shown), a rear upper form 33 and a rear lower fork 34.

The two ends 352, 354 of the upper tube 35 are connected respectively to the head tube 31, and the seat tube 32. In an embodiment of the present invention, at least one of the head tube 31 and the seat tube 32 is connected to the upper tube by using at least one of the rod piece connection devices 1. The two ends 362, 364 of the lower tube 36 are connected respectively to the head tube 31 and the seat tube 32. In an embodiment of the present invention, at least one of the head tube 31 and the seat tube 32 is connected to the lower tube 36 by using at least one of the rod piece connection devices 1.

By way of an example, when the rod piece connection device 1 is connected between the seat tube 32 and the upper tube 35, for the rod piece connection device 1, one of the first connection piece 10 and the second connection piece 20 is fixedly connected to the seat tube 32, while the other one of the first connection piece 10 and the second connection piece 20 is connected fixedly to the upper tube 35. In an embodiment of the present invention, the ways of fixed connection may include welding, soldering, bolt-nut connection, adhesive bonding, or a combination of the above, but the present invention is not limited to this. In practice, any means that is capable of connecting and fixing two objects together can be used in the present invention.

Figure 15:
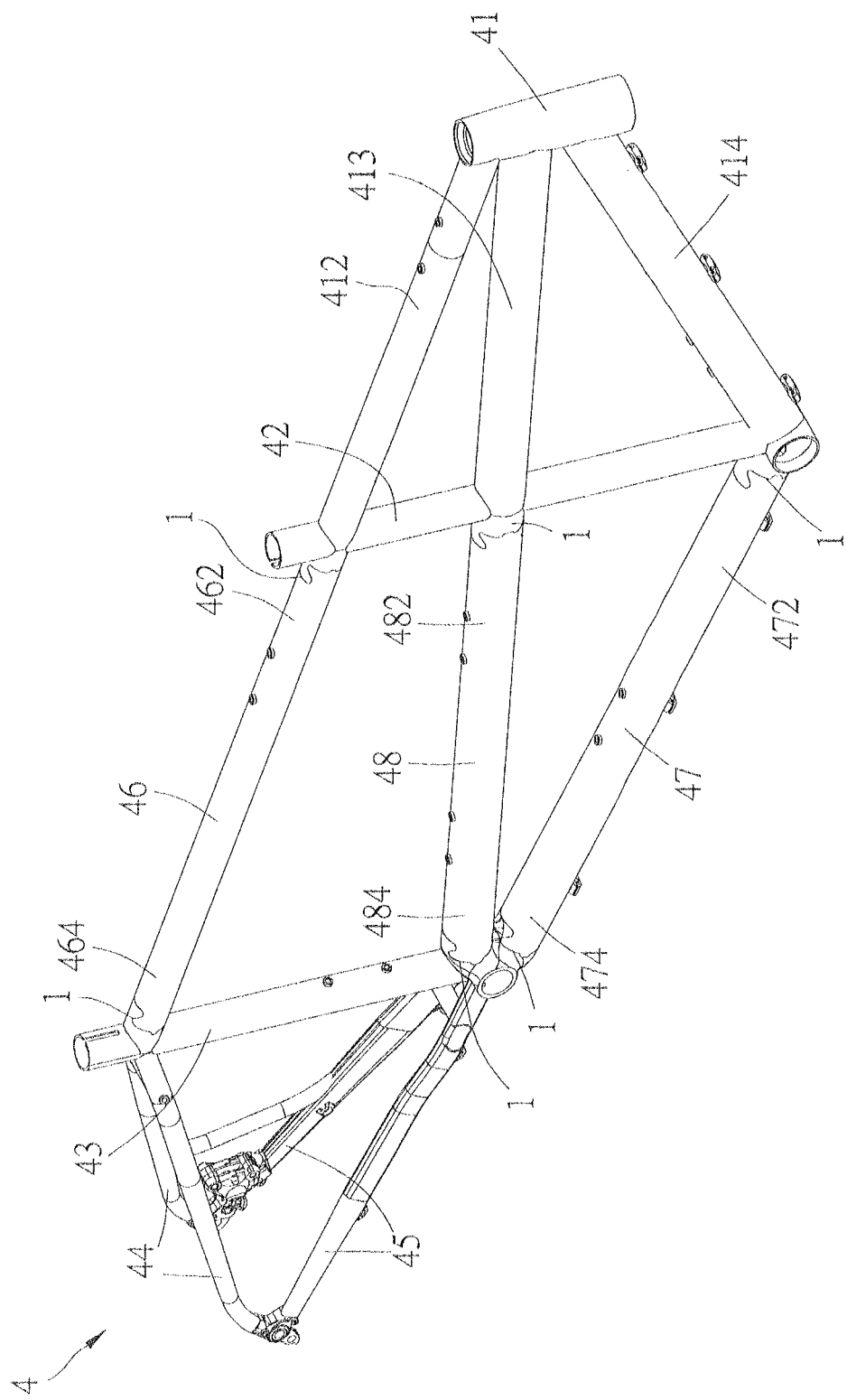
FIG. 15 is a perspective view of a tandem bicycle frame according to another embodiment of the present invention.
Figure 16:
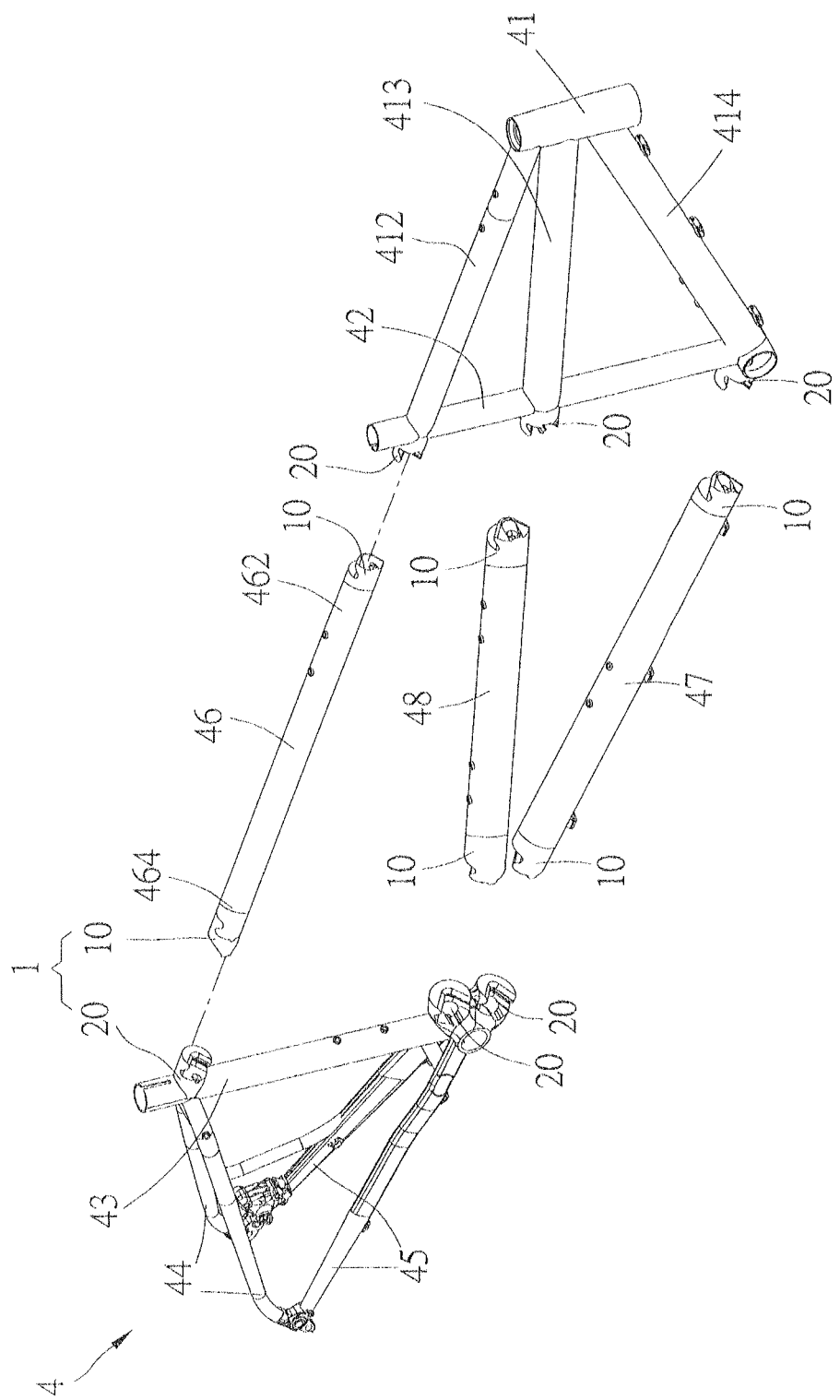
FIG. 16 is a partial exploded view of a tandem bicycle frame as shown in FIG. 15 according to the present invention.

As shown in FIGS. 15 and 16, a tandem bicycle frame 4 includes the following components: a head tube 41, a first seat tube 42, a second seat tube 43, a rear upper fork 44, a rear lower fork 45, an upper connection tube 46, a lower connection tube 47, and a plurality of rod piece connection devices 1.

Further, as shown in FIGS. 15 and 16, the head tube 41 is used to connect a direction handle (not shown) and a front fork (not shown). The first seat tube 42 is used to connect a first saddle (not shown) and a first pedal driving component (not shown). In an embodiment of the present invention, for connecting the head tube 41 to the first seat tube 42, at least a front upper tube 412 and a front lower tube 414 are connected in between. The second seat tube 43 is used to connect the second saddle (not shown), a second pedal driving component (not shown), a rear upper fork 44, and a rear lower fork 45.

Two ends 462, 464 of the upper connection tube 46 are connected respectively to the first seat tube 42 and a second seat tube 43. In an embodiment of the present invention, at least one of the first seat tube 42 and second seat tube 43 is connected to the upper connection tube 46 by using at least one of the rod piece connection devices 1. Two ends 472, 474 of the lower connection tube 47 are connected respectively to the first seat tube 42 and a second seat tube 43. In an embodiment of the present invention, at least one of the first seat tube 42 and second seat tube 43 is connected to the lower connection tube 47 by using at least one of the rod piece connection devices 1.

By way of example, when the rod piece connection device 1 is connected between the first seat tube 42 and the upper connection tube 46, for the rod piece connection device 1, one of the first connection piece 10 and the second connection piece 20 is fixedly connected to the first seat tube 42, while the other of the two pieces is connected fixedly to the upper connection tube 46. In an embodiment of the present invention, the ways of fixed connections may include welding, soldering, bolt-nut connection, adhesive bonding, or a combination of the above, but the present invention is not limited to this. In practice, any means that is capable of fixing and connecting two objects together can be used in the present invention.

In an embodiment of the present invention, the tandem bicycle frame 4 further includes a middle connection tube 48. Two ends 482, 484 of the middle connection tube 48 are connected respectively to the first seat tube 42 and a second seat tube 43, and the middle connection tube 48 is disposed between the upper connection tube 46 and the lower connection tube 47. In an embodiment of the present invention, at least one of the first seat tube 42 and a second seat tube 43 is connected to the middle connection tube 48 by using at least one of the rod piece connection devices.

In an embodiment of the present invention, the head tube 41 and the first seat tube 42 are connected to each other through connecting the front upper tube 412, the front middle tube 413 and the front lower tube 414 in between. And the front middle tube 413 is disposed between the front upper tube 412 and the front lower tube 414.

Through the design and structure mentioned above, the present invention has the advantage in that, the rod piece connection device can be used as a rod piece in a bicycle frame, and through attaching and detaching of the corresponding first connection piece and the second connection piece that are detachable, the rod pieces of the bicycle frame can be assembled or detached depending on the actual requirement, to reduce the volume of the bicycle frame and thus the space it occupies. In addition, the rod piece connection device provided by the present invention is able to achieve joggle joint, thus reducing the additional weight caused by the hinges and fasteners of the conventional folding bicycle frame, providing convenience of shipping and moving the bicycle, while reducing the burden of the user during its carriage. Further, in the present invention, since the hinges and fasteners of the conventional folding bicycle are omitted, therefore, the rod piece connection device and the bicycle frame thus produced could have a compact, neat, and clean outer appearance, in achieving better aesthetical effect.

The above detailed description of the preferred embodiment is intended to describe more clearly the characteristics and spirit of the present invention. However, the preferred embodiments disclosed above are not intended to be any restrictions to the scope of the present invention. Conversely, its purpose is to include the various changes and equivalent arrangements which are within the scope of the appended claims.

What is claimed is:

1. A rod piece connection device, comprising:
    a first connection piece, that includes a first rod piece connection end and a first joggle joint end opposite to the first rod piece connection end, wherein, the first joggle joint end includes a protrusion head tongue portion and a neck portion; and
    a second connection piece, that includes a second rod piece connection end and a second joggle joint end opposite to the second rod piece connection end, the second joggle joint end is located corresponding to the first joggle joint end for them to form into a joggle joint, the second joggle joint end includes a protrusion bottom groove portion and a pillow portion, wherein the protrusion head tongue portion is disposed corresponding to and into the protrusion bottom groove portion, and the neck portion is located corresponding to the pillow portion;

wherein the protrusion head tongue portion is provided with a first region on a first radial plane of the first joggle joint end; and the neck portion is provided with a second region on a second radial plane of the first joggle joint end, the first radial plane is parallel to the second radial plane, the first region of the protrusion head tongue portion is configured to cover the second region of the neck portion;

wherein the first region is provided with a first arc on a protrusion tongue position of the protrusion head tongue portion; and the second region is provided with a second arc on a protrusion end position of the neck portion, the first arc is not less than the second arc.

2. The rod piece connection device as claimed in claim 1, wherein the first connection piece and the second connection piece are connected to each other coaxially in a radial direction.

3. The rod piece connection device as claimed in claim 2, wherein the first joggle joint end includes: a position restricting protrusion block disposed on an end face of the protrusion head tongue portion in protrusion along an axial direction of the first connection piece; and the second joggle joint end includes: a position restricting indent groove disposed on a side face indented in the protrusion bottom groove portion along an axial direction of the second connection piece; when the second joggle joint end and the first joggle joint end are connected to each other in a radial direction to form into a joggle joint, the position restricting protrusion block and the position restricting indent groove are connected to each other in matching, and the end face of the protrusion head tongue portion is in contact with the side face of the protrusion bottom groove portion.

4. The rod piece connection device as claimed in claim 3, wherein in an axial direction of the first connection piece, the protrusion head tongue portion is disposed between the position restricting protrusion block and the neck portion; and in an axial direction of the second connection piece, the protrusion bottom groove portion is located between the position restricting indent groove and the pillow portion.

5. The rod piece connection device as claimed in claim 3, wherein in the axial direction of the first connection piece, the neck portion is located close toward the first rod piece connection end, the protrusion head tongue portion is disposed away from the first rod piece connection end; and in the axial direction of the second connection piece, the pillow portion is located away from the second rod piece connection end, and the protrusion bottom groove portion is located close toward the second rod piece connection end.

6. The rod piece connection device as claimed in claim 2, wherein when the second joggle joint end and the first joggle joint end are connected to each other in a radial direction to form into a joggle joint, the protrusion head tongue portion and the protrusion bottom groove portion are connected to each other in matching, and the neck portion and the pillow portion are connected to each other in matching.

7. The rod piece connection device as claimed in claim 1, wherein in the axial direction of the first connection piece, the neck portion is located close toward the first rod piece connection end, the protrusion head tongue portion is disposed away from the first rod piece connection end; and in the axial direction of the second connection piece, the pillow portion is located away from the second rod piece connection end, and the protrusion bottom groove portion is located close toward the second rod piece connection end.

8. The rod piece connection device as claimed in claim 1, wherein the protrusion bottom groove portion is provided with a third region on a third radial plane of the second joggle joint end; and the pillow portion is provided with a fourth region on a fourth radial plane of second joggle joint end, the third radial plane is parallel to the fourth radial plane, the fourth region of the pillow portion is configured to cover the third region of the protrusion bottom groove portion.

9. The rod piece connection device as claimed in claim 8, wherein in the third region is provided with a third arc on a protrusion bottom position of the protrusion bottom groove portion; and in the fourth region is provided with a fourth arc on a indent bottom position of the pillow portion, the third arc is not less than the fourth arc.

10. The rod piece connection device as claimed in claim 9, wherein the first arc is equal to the third arc, and the second arc is equal to the fourth arc.

11. The rod piece connection device as claimed in claim 1, wherein the protrusion bottom groove portion is provided with a third region on a third radial plane of the second joggle joint end; and the pillow portion is provided with a fourth region on a fourth radial plane of second joggle joint end, the third radial plane is parallel to the fourth radial plane, the fourth region of the pillow portion is configured to cover the third region of the protrusion bottom groove portion.

12. The rod piece connection device as claimed in claim 1, wherein the protrusion head tongue portion is provided with a first slant leaning face and a second slant leaning face, connected to each other in an axial direction of the first joggle joint end; the protrusion bottom groove portion is provided with a third slant leaning face and a fourth slant leaning face, connected to each other in an axial direction of the second joggle joint end; when the first joggle joint end and the second joggle joint end are connected to each other to form into a joggle joint, the first slant leaning face is in contact with the third slant leaning face, the second slant leaning face is in contact with the fourth slant leaning face, to act against a bending force in a first direction and a retraction force in the axial direction, the bending force in the first direction is perpendicular to an axial direction of the first joggle joint end and the second joggle joint end, the retraction force in the axial direction is parallel to or is connected coaxially to the axial direction of the first joggle joint end and the second joggle joint end.

13. The rod piece connection device as claimed in claim 12, wherein in an axial direction of the second joggle joint end, the pillow portion is provided with a curved cladding face, in the axial direction of the first joggle joint end, the neck portion is provided with a curved cladded face; when the first joggle joint end and the second joggle joint end are connected to each other to form into a joggle joint, the curved cladding face and the curved cladded face are in contact with each other, to act against the bending force in a second direction and the retraction force in the axial direction, the bending force in the second direction is perpendicular to the axial direction of the first joggle joint end and the second joggle joint end, and the bending force in the second direction is perpendicular to the bending force in the first direction.

14. A bicycle frame, comprising:
a head tube, connected to a direction handle and a front fork;
a seat tube, connected to a saddle, a pedal driving component, a rear upper fork, a rear lower fork;
a plurality of rod piece connection devices as claimed in claim 1;
an upper tube, with its two ends connected to the head tube and a seat tube respectively, wherein at least one of the head tube and the seat tube is connected to the upper tube through using at least one of the rod piece connection devices; and
a lower tube, with its two ends connected to the head tube and the seat tube respectively, wherein at least one of the head tube and the seat tube is connected to the lower tube through using at least one of the rod piece connection devices.

15. A tandem bicycle frame, comprising:
a head tube, connected to a direction handle and a front fork;
a first seat tube, connected to a first saddle, and a first pedal driving component, wherein the head tube and the first seat tube are connected to each other by using at least a front upper tube and a front lower tube connected in between;
a second seat tube, connected to a second saddle, and a second pedal driving component, a rear upper fork, and a rear lower fork;
a plurality of rod piece connection devices;
an upper connection tube, with its two ends connected to the first seat tube and the second seat tube respectively, wherein at least one of the first seat tube and the second seat tube is connected to the upper connection tube through using at least one of the rod piece connection devices; and
a lower connection tube, with its two ends connected to the first seat tube and the second seat tube respectively, wherein at least one of the first seat tube and the second seat tube is connected to the lower connection tube through using at least one of the rod piece connection devices;
a middle connection tube, with its two ends connected to the first seat tube and the second seat tube respectively, and the middle connection tube is disposed between the upper connection tube and the lower connection tube, wherein at least one of the first seat tube and the second seat tube is connected to the middle connection tube through using at least one of the rod piece connection devices.

16. The tandem bicycle frame as claimed in claim 15, wherein the head tube and the first seat tube are connected through using a front upper tube, a front middle tube, and a front lower tube, and the front middle tube is disposed between the front upper tube and the front lower tube.

* * * * *